(12) United States Patent  (10) Patent No.: US 7,645,152 B2
Tsai  (45) Date of Patent: Jan. 12, 2010

(54) BACKLIGHT MODULE

(75) Inventor: Chia-Chang Tsai, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 12/145,028

(22) Filed: Jun. 24, 2008

(65) Prior Publication Data

US 2009/0196055 A1 Aug. 6, 2009

(30) Foreign Application Priority Data

Feb. 5, 2008 (TW) .............................. 97104530 A

(51) Int. Cl.
*H01R 33/02* (2006.01)
(52) U.S. Cl. ...................... 439/228; 362/225
(58) Field of Classification Search ......... 439/226–244, 439/541, 336, 547; 349/60; 362/225, 631, 362/634
See application file for complete search history.

(56) References Cited

U.S. PATENT DOCUMENTS 3,344,388 A * 9/1967 Parker et al. .................. 439/57

7,086,775 B2 8/2006 Huang et al.
2006/0279957 A1 12/2006 Kwon et al.

FOREIGN PATENT DOCUMENTS

| EP | 2 045 519 | 8/2009 |
| WO | WO 2007/041128 | 4/2007 |
| WO | WO 2008/001566 | 1/2008 |

OTHER PUBLICATIONS

Chinese language office action dated Aug. 21, 2009.

* cited by examiner

*Primary Examiner*—Ross N Gushi
(74) *Attorney, Agent, or Firm*—Thomas, Kayden, Horstemeyer & Risley

(57) ABSTRACT

A lamp connection structure, configured to connect a lamp of a backlight module, is provided. The backlight module has a circuit board formed with a through-hole, which is defined by a side wall. The lamp connection structure comprises a clamping portion and an embedding portion. The clamping portion has a first end and a second end, and the first end is adapted to fix and to electrically connect to the lamp. The embedding portion has a first end and a second end. The first end is connected to the second end of the clamping portion while the second end of the embedding portion is inserted through the through-hole and contacting with the side wall.

20 Claims, 5 Drawing Sheets

BACKLIGHT MODULE

CROSS-REFERENCES TO RELATED APPLICATIONS

This application claims priority to Taiwan Patent Application No. 097104530 filed on Feb. 5, 2008, the disclosure of which is incorporated herein by reference. Also, the subject matter of this application is generally related to the subject matter of U.S. patent application Ser. No. 11/971,237, filed Jan. 8, 2008.

BACKGROUND OF THE INVENTION

1. Field of the Invention

The present invention relates to a lamp connection structure, and more particularly, relates to a lamp connection structure for connecting a lamp of a backlight module in a liquid crystal display (LCD).

2. Descriptions of the Related Art

As the LCD technologies are becoming ever more sophisticated, increasingly heightened requirements are being imposed on LCDs by both manufacturers related to LCD panels and average users. From the standpoint of the manufacturers, a simpler manufacturing process will be preferred as this may not only advance the delivery time but also save the production cost. On the other hand, from the standpoint of average users, in addition to the economical benefits arising from the low cost, lightweight and small volume are also factors of great concern when a user makes a purchase decision. Since the volume of the backlight module is a crucial factor that dominates the volume of an LCD, how to minimize the structure of the backlight module has become a focus of research in this industry.

During a process of manufacturing a backlight module of a conventional LCD, circuits on a circuit board are electrically connected to a cold cathode fluorescent lamp (CCFL) by using a lamp connection structure. As shown in FIG. 1, the backlight module 1 comprises a CCFL 10, a printed circuit board (PCB) 11, a lamp support 12, an insulating plate 13, a back plate 14 and an inverter PCB 15. A base portion 132 of the lamp support 12 is welded to a top surface of the PCB 11. An upper end of the lamp support 12 is formed with a clamping portion 130 adapted to clamp and electrically connect with the CCFL 10, and a lower end of the lamp support 12 is formed with an embedding portion 131 protruding from a bottom surface of the PCB 11. The embedding portion 131 is inserted through a hole 135 in the insulating plate 13 and then through a corresponding receiving hole (not shown) in the back plate 14 to be embedded into a holder 151 on the inverter PCB 15, thus accomplishing the snap fit attachment. Also, the holder 151 is welded to the inverter PCB 15.

However, in such a structure, it is challenging and complex to assemble the lamp support 12 and the holder 151, and it is time consuming to weld the lamp support 12 and the holder 151 to the PCB 11 and the inverter PCB 15 respectively. Furthermore, the PCB 11 and the holder 151 also add to the cost. Consequently, the conventional lamp connection structure not only occupies a large volume in the backlight module and requires a complex assembling procedure, but also leads to extended production duration and increased costs.

In view of this, it is highly desirable in the art to provide a lamp connection structure of a backlight module that features a simplified structure, smaller volume, and convenient assembly procedure without need of welding operations, thereby decreasing the cost.

SUMMARY OF THE INVENTION

One objective of this invention is to provide a lamp connection structure for connecting a lamp of a backlight module. The backlight module has a circuit board formed with a through-hole, and the through-hole is defined by a side wall. The lamp connection structure comprises a clamping portion and an embedding portion. The clamping portion has a first end and a second end, in which the first end is adapted to fix and electrically connect to the lamp. The embedding portion has a first end and a second end, in which the first end is connected to the second end of the clamping portion, while the second end of the embedding portion is inserted through the through-hole. The through-hole is formed with a conductive layer on the side wall for electrically connecting the second end of the embedding portion with the circuit.

Another objective of this invention is to provide a lamp connection structure comprising a clamping portion and an embedding portion. The clamping portion has a first end and a second end, with the first end being adapted to fix and electrically connect to a lamp. The embedding portion has a first end and a second end, in which the first end is connected to the second end of the clamping portion, while the second end of the embedding portion has a continuously tapered shape.

With the above lamp connection structure, it is easy for the continuously tapered embedding portion to be embedded into and fixed on a circuit board during assembly of a backlight module, thus allowing the clamping portion to clamp the lamp securely. In this way, the number of PCBs to be used is decreased to facilitate assembly of the lamp and the circuit board, and moreover, the volume of the backlight module is decreased, thereby lowering the production cost.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
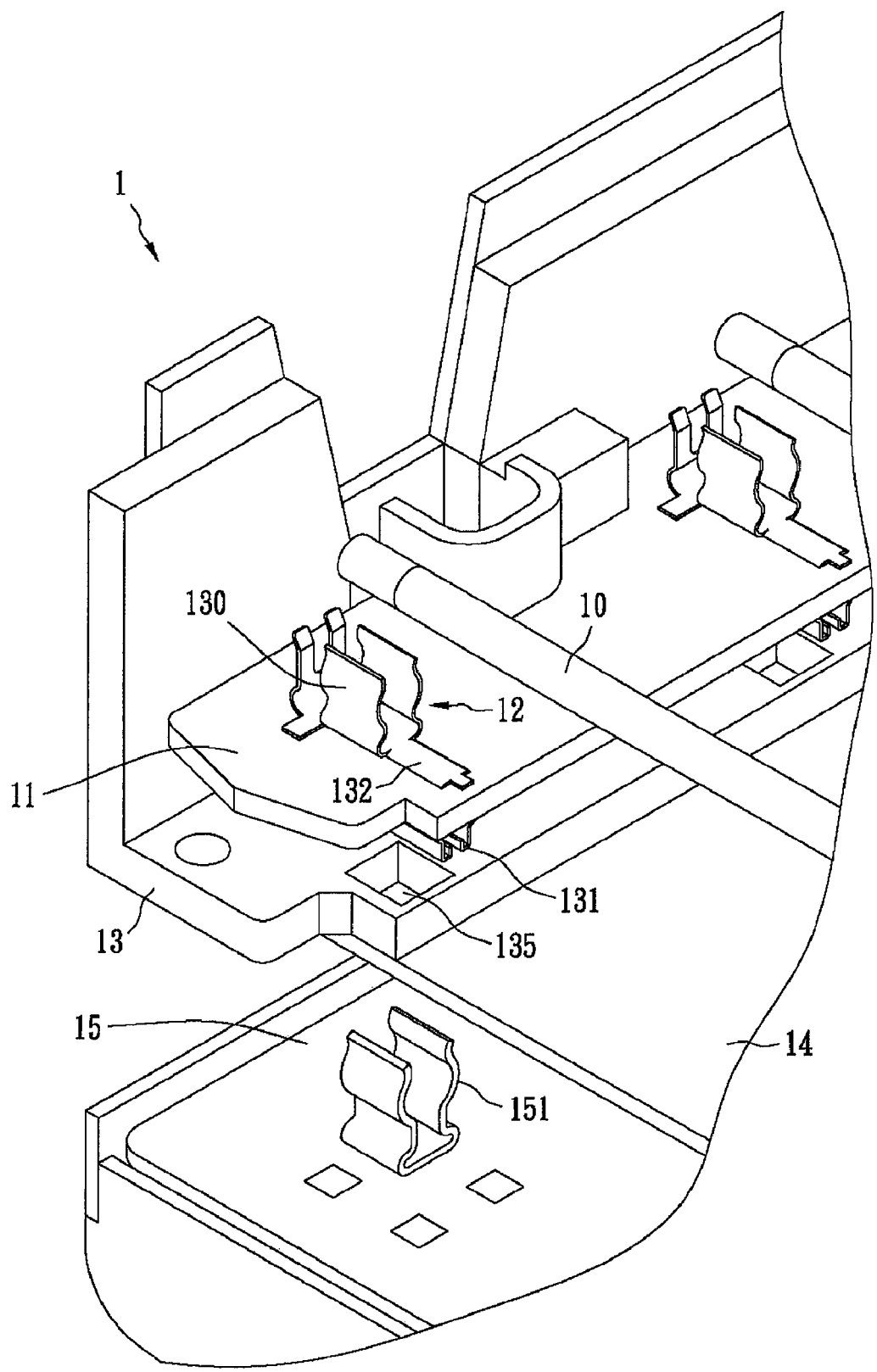
FIG. 1 is an exploded view of a conventional lamp connection structure.
Figure 2:
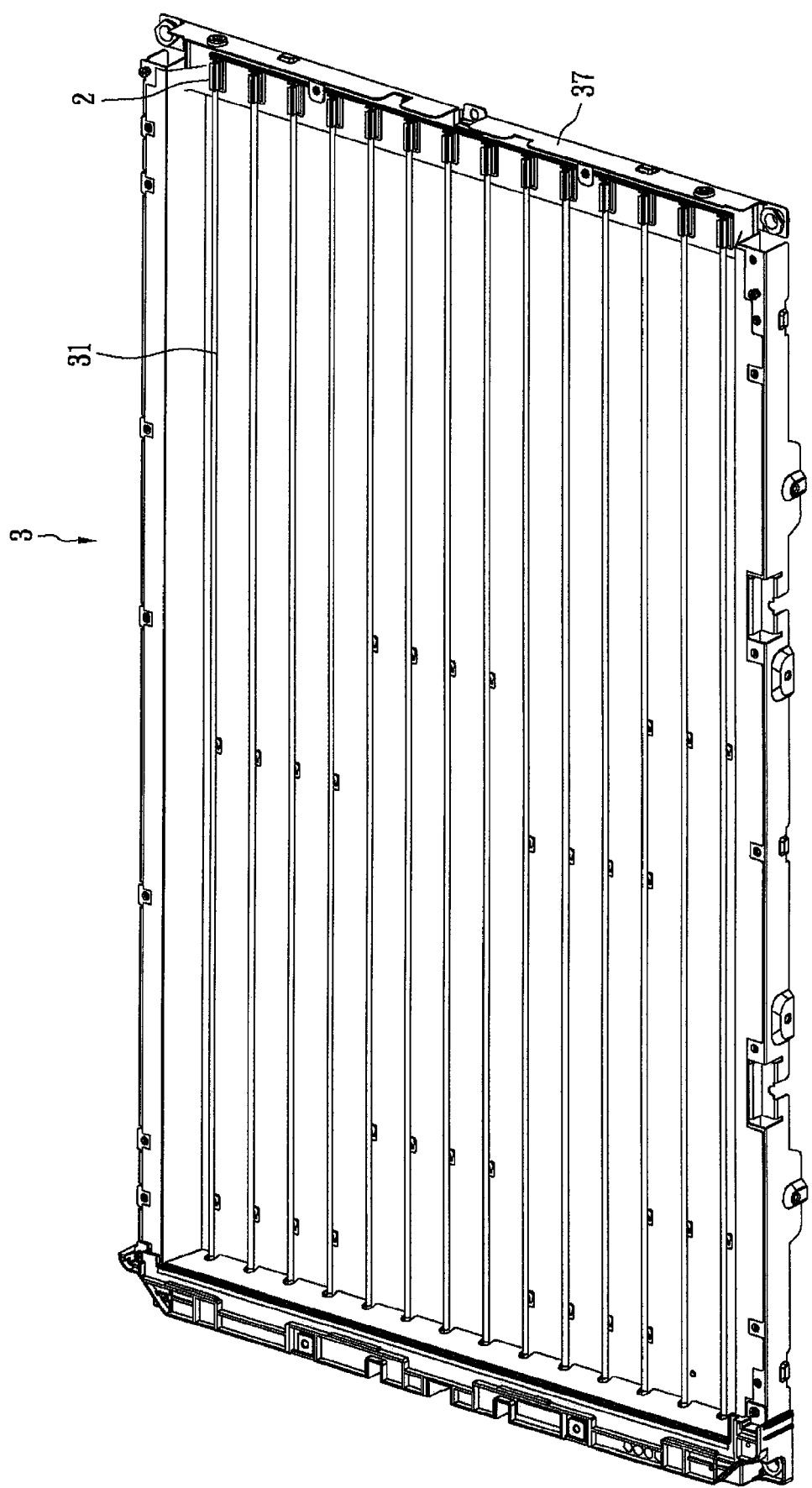
FIG. 2 is a schematic view of a backlight module structure according to an embodiment of this invention.
Figure 3:
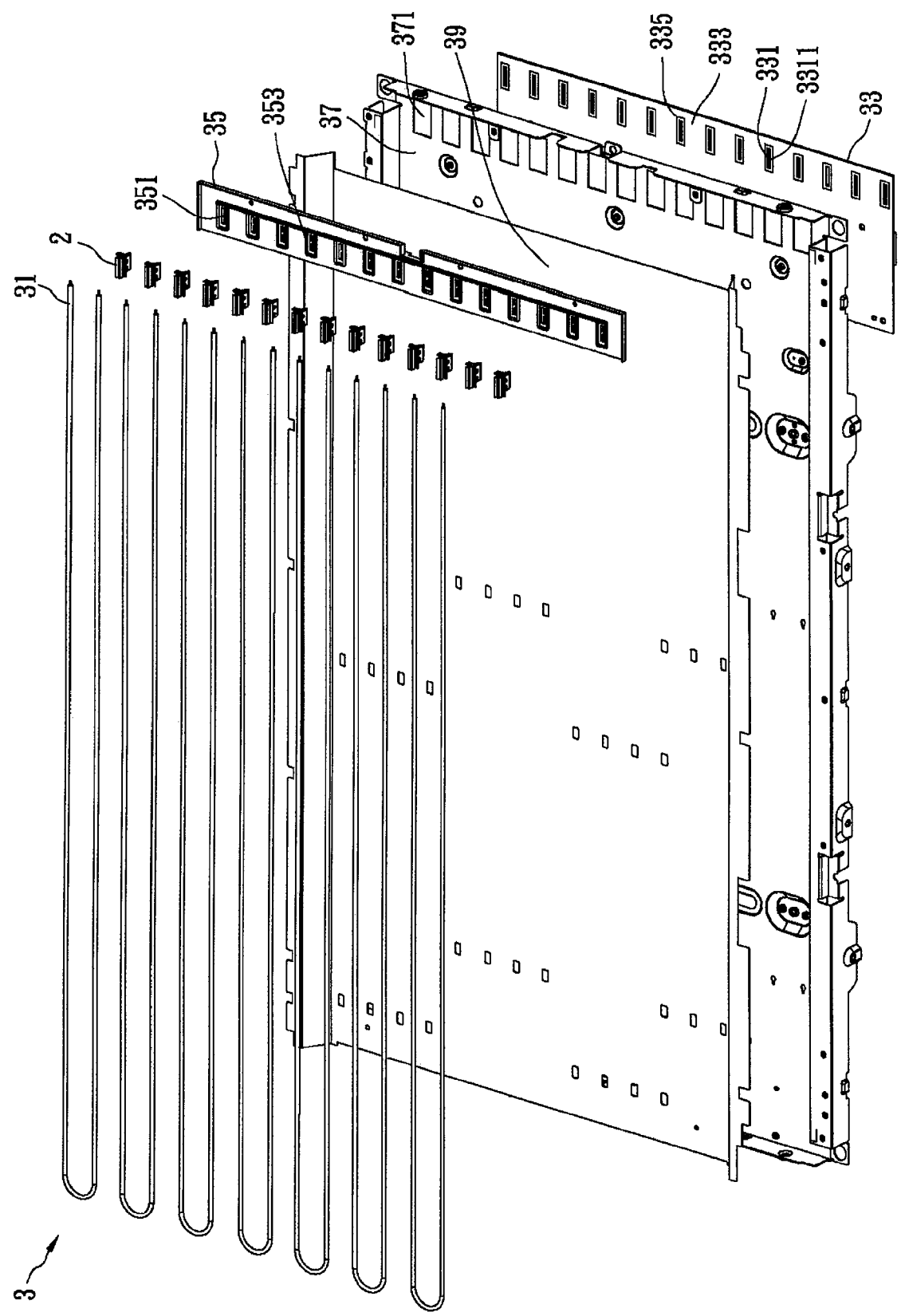
FIG. 3 is an exploded view of a backlight module structure according to an embodiment of this invention.
Figure 4:
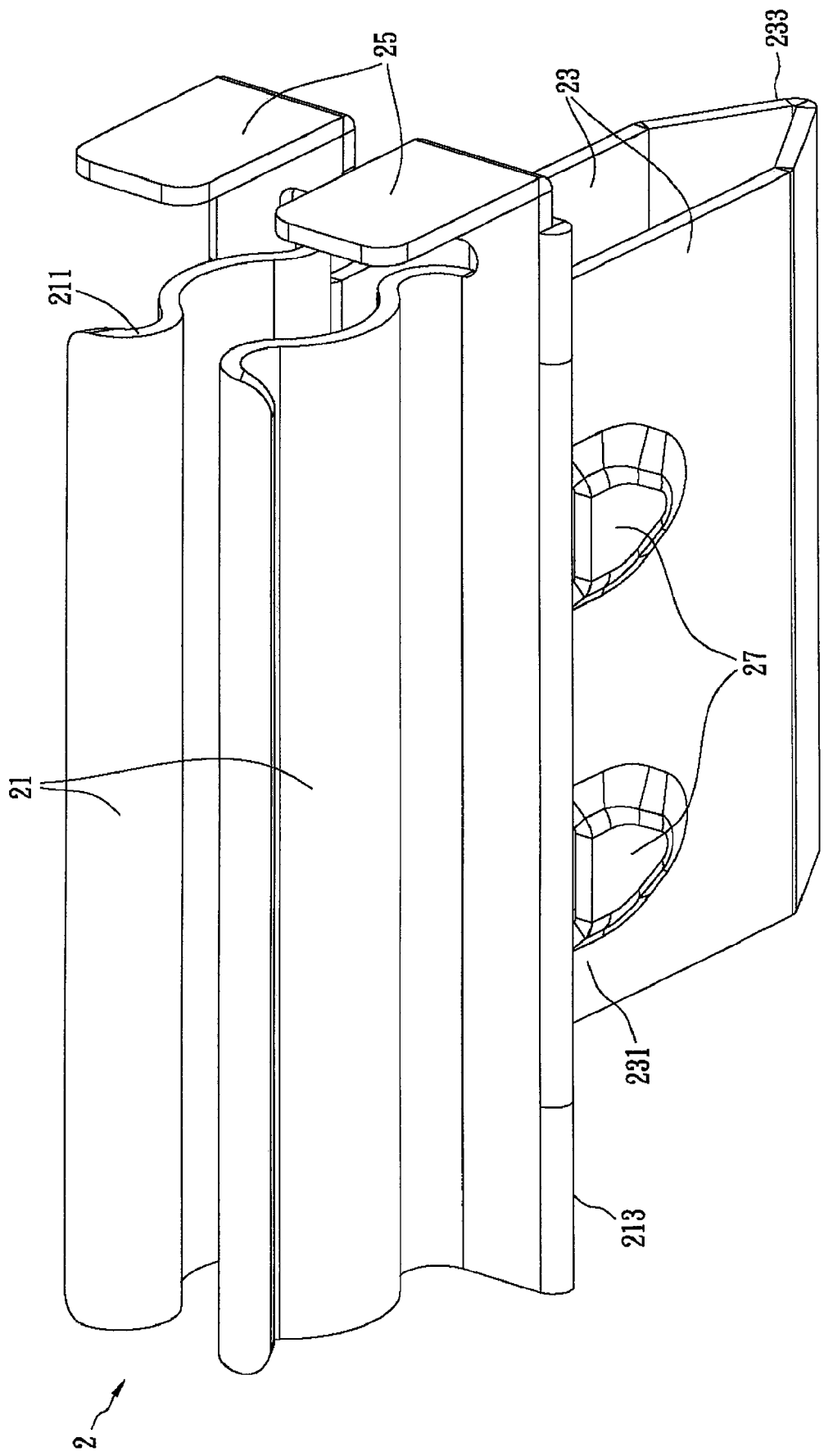
FIG. 4 is a schematic view of a lamp connection structure according to an embodiment of this invention.

A preferred embodiment of this invention is a backlight module 3, an assembled view and an exploded view of which are depicted in FIG. 2 and FIG. 3 respectively. The backlight module 3 comprises a plurality of lamps 31, a circuit board 33, a plurality of lamp connection structures 2, an insulating plate 35, a back plate 37 and a reflective sheet 39. A schematic view of such a lamp connection structure is depicted in FIG. 4. In this embodiment, the number of the lamps 31 and that of the lamp connection structures 2 correspond to each other and both are fourteen. It should be noted that the number of the lamps 31 depicted herein, as well as the following relevant descriptions, is only for purpose of illustration, and the appropriate number for other examples will readily occur to those skilled in the art. Furthermore, cold cathode fluorescent lamps (CCFLs) are adopted for the lamps 31 in this embodiment to act as light sources.

The circuit board 33 is an inverter PCB commonly used in the modern LCD industry. The circuit board 33 incorporates a circuit (not shown), and has a plurality of through-holes 331 formed thereon, each of which is defined by a side wall 3311. The number of the through-holes 331 also corresponds to that of the lamp connection structures 2 and the lamps 31 (i.e., fourteen). However, as previously described, this invention is not merely limited to this number. In this embodiment, the through-holes 331 of the circuit board 33 are formed through a plated through-hole (PTH) process commonly used for making insertion holes on a conventional PCB. Each of the through-holes 331 are plated with a conductive layer (not shown) on the respective side wall 3311. In this embodiment, the conductive layer is made of copper. However, in other examples, the material of the conductive layer is not limited to copper, but may also be other conductive metals such as Au, Ag, or alloys thereof. Furthermore, the circuit board 33 has a first surface 333 and a second surface (not shown) corresponding to the first surface 333, both of which are provided with a plurality of conductive rings 335 thereon adjacent to a top portion and a bottom portion of the side wall 3311. In this embodiment, there are twenty eight conductive rings 225 in total, although, as previously described, this invention is not merely limited thereto.

The insulating plate 35 is formed with a plurality of fixing holes 351 and a plurality of insulating frames 353. The fixing holes 351 are adapted to correspond to the through-hole 331, and the insulating frames 353 protrude from the top and the bottom surfaces of the insulating plate 35 and are annularly disposed around a perimeter of the fixing holes 351. The back plate 37 is sandwiched between the insulating plate 35 and the circuit board 33. The other side of the insulating plate 35 adjoins the reflective sheet 39, which in turn abuts against the back plate 37. The reflective sheet 39 is configured to reflect light emitted from the lamp 31. The back plate 37 is formed with a plurality of receiving holes 371 to correspond to the fixing holes 351 and the through-holes 331. Each of the insulating frames 353 has an outer contour corresponding to an inner contour of the receiving holes 371 of the back plate 37, which allows the insulating frame 353 to be inserted through the receiving hole 371 and fixed therein. Similarly, the number of the fixing holes 351, the insulating frames 353 and the receiving holes 371 recited herein corresponds to that of the lamps 31, the lamps connection structures 2 and the through-holes 331 recited above.

The lamp connection structure 2 is configured to connect a corresponding lamp 31 of the backlight module 3 with the circuit of the circuit board 33. As shown in FIG. 4, each of the lamp connection structure 2 comprises a clamping portion 21 and an embedding portion 23. The clamping portion 21 has a first end 211 and a second end 213. The first end 211 is adapted to clamp and electrically connect with the lamp 31. The first end 211 of the clamping portion 21 is further provided with a stopping portion 25, which is configured to stop an axial displacement of the lamp 31 attributed possibly to swing of the lamp or the installation deviation.

Figure 5:
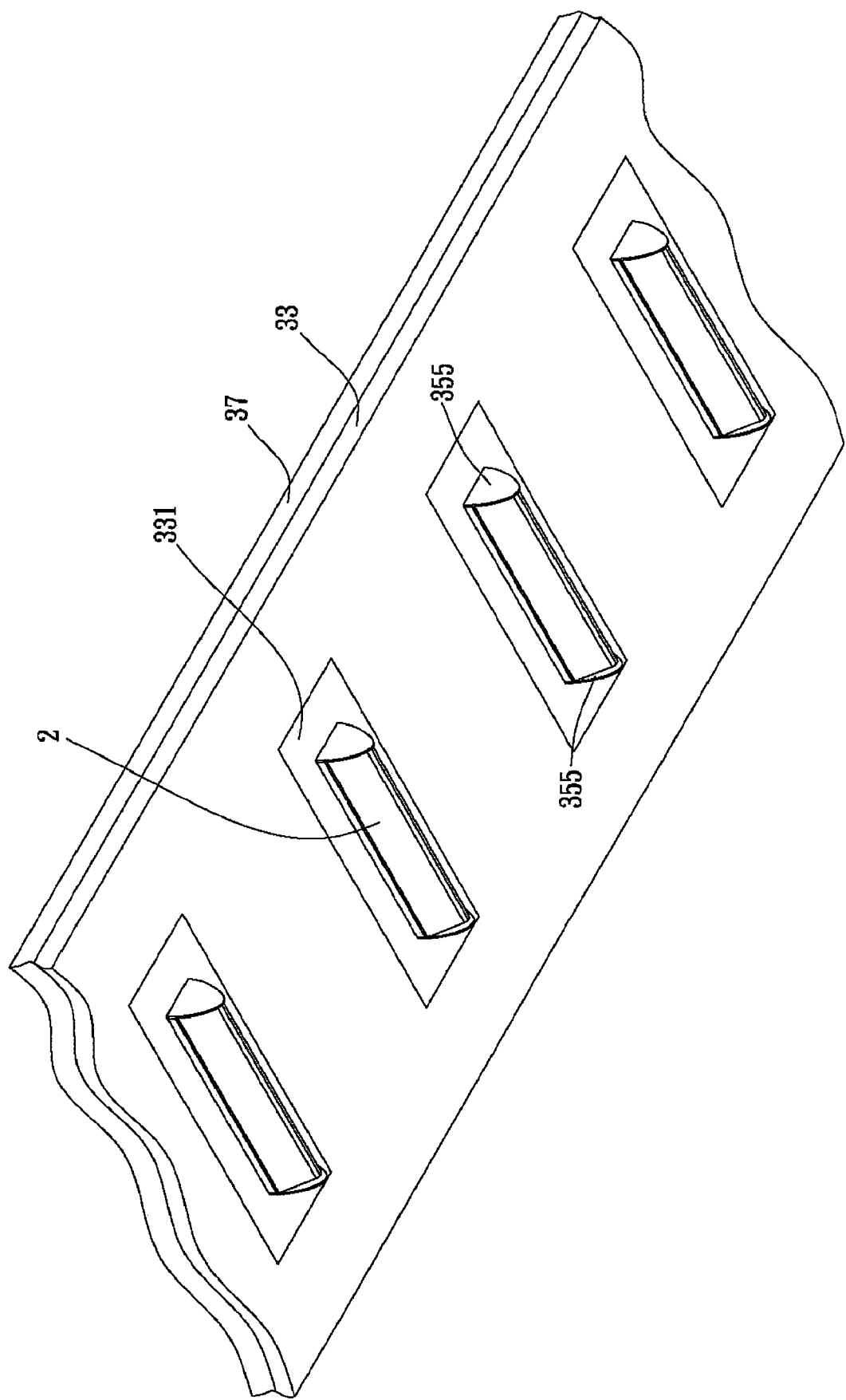
FIG. 5 is a bottom view of a backlight module structure according to an embodiment of this invention.

The embedding portion 23 has a first end 231, a second end 233 and a snap fit element 27. The first end 231 of the embedding portion 23 is connected to the second end 213 of the clamping portion 21. The second end 233 of the embedding portion 23 is of an elastic nature and has a continuously tapered shape. The continuously tapered shape makes it easy for the embedding portion 23 to be sequentially inserted through the through-holes 331, the fixing holes 351 and the receiving holes 371 corresponding to each other and make a contact with the side wall 3311. Furthermore, as depicted in a bottom view of FIG. 5, two opposite sides of the outer contour of each insulating frame 353 are extended respectively to form guiding plates 355. The guiding plates 355 are adapted to guide the continuously tapered structure of the embedding portion 23 of the lamp connection structure 2 to be inserted through the receiving holes 371 and the through-holes 331 in company therewith, so that the embedding portion 23 projects from the second surface of the circuit board 33. Furthermore, the two guiding plates 355 are adapted to clamp and guide two sides of the lamp connection structure 2 for protection.

Each of the embedding portions 23 has a snap fit element 27 for elastically snap fitting the lamp connection structure 2 to the insulation frame 253. Meanwhile, the embedding portion 23 is adapted to form an interference fitting with the side wall 3311 of the through-hole 331, so that the integrally formed lamp connection structure 2 can be secured to the circuit board 33.

By using the conductive layer formed on the side wall 3311 of the through-hole 331, the first end 231 and the second end 233 of the embedding portion can be electrically connected with the circuit of the circuit board 33 after being inserted through the through-hole 331, the fixing hole 351 and the receiving hole 371 corresponding to each other. After receiving a current from a power supply source (not shown) via the lamp connection structure 2, the circuit of the circuit board 33 can be electrically connected with the second end 233 of the embedding portion 23 via the conductive layer on the side wall 3311 of the through-hole 331, and once the embedding portion 23 and the clamping portion 21 are both electrically connected, the lamp 31 will be turned on.

In this embodiment, the lamp connection structure 2 is a one piece metal plate; however, in other examples, the lamp connection structure 2 may be of other configurations, styles or materials that facilitate insertion thereof and allow electrical connection with the circuit board 33. Additionally, in other examples, the number of the lamps 31, the lamp connection structures 2, the through-holes 331, the fixing holes 351, the insulation frames 353, the receiving holes 371 and other corresponding structures also correspond to each other. However, it is not limited to the number described above, and the appropriate number for other examples may readily occur to those skilled in the art.

In summary, the integrally formed lamp connection structure of this invention allows easy assembly with the lamps and the circuit board. This may not only eliminate the need of elements such as the PCB and the two-piece lamp connection structure (i.e., the lamp support 12 and the holder 151) and the welding process, but may further shrink the overall dimensions of the backlight module and lower the production cost.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A backlight module, comprising:
a tubular lamp, having an axial direction;
a circuit board, formed with a through-hole and the through-hole being defined by at least two opposing side walls; and a lamp connection structure, comprising:
- a clamping portion, having a first end and a second end, and the first end being adapted to fix and to electrically connect to the tubular lamp, wherein the axial direction of the tubular lamp is substantially perpendicular to a direction that the first end extends to the second end; and
- an embedding portion, having a first end and a second end, the first end being connected to the second end of the clamping portion, and the second end of the embedding portion being elastic and having a continuously tapered shape inserted through the through-hole and contacting with the at least two opposing side walls.

2. The backlight module as claimed in claim 1, wherein the first end of the clamping portion is further disposed with a stopping portion, and the stopping portion is configured to stop an axial displacement of the tubular lamp.

3. The backlight module as claimed in claim 1, wherein the embedding portion has a snap fit element, and the snap fit element is configured to fix the lamp connection structure to the circuit board.

4. The backlight module as claimed in claim 1, wherein the lamp connection structure is a one piece metal plate.

5. The backlight module as claimed in claim 4, wherein the second end of the embedding portion is adapted to provide an interference fitting with the at least two opposing side walls of the through-hole.

6. The backlight module as claimed in claim 1, wherein the circuit board has a circuit configured to receive a power supply source, and the at least two opposing side walls of the through-hole electrically connects to the circuit.

7. The backlight module as claimed in claim 6, wherein the circuit board has a first surface and a second surface corresponding thereto, and at least one of the first surface and the second surface is disposed with a conductive ring, and the conductive ring is adjacent to contact the at least two opposing side walls of the through-hole, and the conductive ring is configured to electrically conduct the second end of the embedding portion and the circuit.

8. The backlight module as claimed in claim 6, wherein each of the at least two opposing side walls of the through-hole is formed with a conductive layer, and the conductive layer is configured to electrically conduct the second end of the embedding portion and the circuit.

9. The backlight module as claimed in claim 8, wherein the conductive layer is an electrically conductive metal selected from the group consisting of copper, silver, gold and alloy thereof.

10. The backlight module as claimed in claim 1, further comprising an insulating plate, and the insulating plate having a fixing hole corresponding to the through-hole.

11. The backlight module as claimed in claim 10, further comprising a back plate disposed between the insulating plate and the circuit board, and the back plate having a receiving hole corresponding to the fixing hole and the through-hole.

12. The backlight module as claimed in claim 11, wherein the embedding portion is inserted through the fixing hole, the receiving hole and the through-hole in order.

13. The backlight module as claimed in claim 10, wherein the insulating plate further has an insulating frame projecting from a surface of the insulating plate, and the insulating frame is annularly disposed around a perimeter of the fixing hole.

14. The backlight module as claimed in claim 13, wherein an outer contour of the insulating frame is adapted to correspond to an inner contour of the receiving hole.

15. The backlight module as claimed in claim 13, wherein two opposite sides of the outer contour of the insulating frame are extended respectively to form guiding plates.

16. The backlight module as claimed in claim 1, wherein the circuit board is an inverter PCB (Printed Circuit Board).

17. A lamp connection structure, comprising:
- a clamping portion, having a first end and a second end, and the first end being adapted to fix and to electrically connect to a tubular lamp, wherein an axial direction of the tubular lamp is substantially perpendicular to a direction that the first end extends to the second end; and
- an embedding portion, having a first end and a second end, the first end being connected to the second end of the clamping portion, and the second end of the embedding portion being elastic and having a continuously tapered shape.

18. The lamp connection structure as claimed in claim 17, wherein the second end of the embedding electrically connects to an electric circuit board.

19. The lamp connection structure as claimed in claim 18, wherein the circuit board is formed with a through-hole, defined by at least two opposing side walls, and the second end of the embedding portion is inserted through the through-hole and contacting with the at least two opposing side walls.

20. The lamp connection structure as claimed in claim 19, wherein the at least two opposing side walls of the through-hole is formed with a conductive layer, and the conductive layer is configured to electrically conduct the second end of the embedding portion and a circuit of the electric board.

* * * * *